United States Patent
Vogelpohl et al.

(10) Patent No.: US 7,166,222 B2
(45) Date of Patent: Jan. 23, 2007

(54) METHOD FOR BIOLOGICALLY PURIFYING WASTE WATER

(75) Inventors: Alfons Vogelpohl, Clausthal-Zellerfeld (DE); Soo-Myung Kim, Clausthal-Zellerfeld (DE)

(73) Assignee: Technocon GmbH, Clausthal-Zellerfeld (DE)

( * ) Notice: Subject to any disclaimer, the term of this patent is extended or adjusted under 35 U.S.C. 154(b) by 0 days.

(21) Appl. No.: 10/567,189

(22) PCT Filed: Oct. 7, 2003

(86) PCT No.: PCT/EP03/11043

§ 371 (c)(1),
(2), (4) Date: Feb. 3, 2006

(87) PCT Pub. No.: WO2005/044740

PCT Pub. Date: May 19, 2005

(65) Prior Publication Data

US 2006/0249453 A1    Nov. 9, 2006

(51) Int. Cl.
*C02F 3/00* (2006.01)
(52) U.S. Cl. .................. 210/620; 210/220
(58) Field of Classification Search ........... 210/620, 210/220
See application file for complete search history.

(56) References Cited

FOREIGN PATENT DOCUMENTS

| | | |
|---|---|---|
| DE | 3703824 | 8/1988 |
| DE | 4012300 | 10/1991 |
| DE | 4105726 | 9/1992 |
| DE | 19842332 | 3/2000 |
| EP | 0130499 | 1/1985 |
| FR | 1448154 | 1/1966 |
| FR | 90565 | 1/1968 |
| GB | 1214818 | 12/1970 |
| GB | 136789 | 8/1974 |
| SU | 946623 | 7/1982 |

OTHER PUBLICATIONS

"Chemical engineering of aerobic waste water treatment—developments and trends;" Marko Zlokarnik; Verlag Chemie GmbH 1982; Chem.-Ing. Tech. 54 (1982) Nr. 11, pp. 939-952.

*Primary Examiner*—Chester T. Barry
(74) *Attorney, Agent, or Firm*—Alfred A. Fressola; Ware, Fressola, Van Der Sluys & Adolphson LLP

(57) ABSTRACT

A method is described for the biological cleaning of waste water, in which the waste water and gas are supplied to a reaction vessel (1) containing micro organisms through a two-component nozzle (2) which consists exclusively of two steady mutually concentric tubes, the nozzle having no additional supply elements and projecting into the reaction vessel and into the waste water therein along its vertical axis. The internally located gas-conveying inner tube of the two-component nozzle (2) is surrounded through the intermediary of a free annular gap by the outer tube conveying the waste water which is delivered by means of a pump (12). The gas ends within the outer tube at a spacing from the outlet opening (3) thereof which is greater by at least a factor of "5" than the internal diameter of the outer tube in the vicinity of the outlet opening (3).

7 Claims, 3 Drawing Sheets

METHOD FOR BIOLOGICALLY PURIFYING WASTE WATER

CROSS REFERENCE TO RELATED APPLICATIONS

This application is for entry into the U.S. national phase under §371 for International Application No. PCT/EP2003/011043 having an international filing date of Oct. 7, 2003, and from which priority is claimed under all applicable sections of Title 35 of the United States Code including, but not limited to, Sections 120, 363 and 365(c).

TECHNICAL FIELD

The invention relates to a method for the biological cleaning of waste water in which the waste water and gas are supplied to a reaction vessel containing micro organisms through a two-component nozzle which consists exclusively of two steady mutually concentric tubes, said nozzle having no additional supply elements and projecting into the reaction vessel and into the waste water therein along its vertical axis, wherein the internally located, gas-conveying inner tube of the two-component nozzle is surrounded through the intermediary of a free annular gap by the outer tube conveying the waste water which is delivered by means of a pump, and in which the mixture of waste water and gas in the reaction vessel is moved in circulatory manner (EP 0 130 499 B1).

BACKGROUND OF THE INVENTION

In the process of biologically cleaning waste water, organic pollutants are converted into innocuous materials by micro organisms—referred to hereinafter as "biomass"—using oxygen. The waste water is cleaned by gassing a biomass-water mixture in a reaction vessel to which waste water and gas are continuously supplied and a comparable quantity of biomass-water mixture is extracted. The term "gas" is to be understood as meaning air, air enriched with oxygen or pure oxygen gas.

Organically charged waste water is produced in the domestic sphere as well as in many industrial processes. Methods for eliminating the dissolved organic compounds in an aerobic manner by means of micro organisms for the purposes of cleaning such waste water are known. These methods are usually carried out in flat aeration tanks. The disadvantages of such methods, such as the noxious smell produced in the surrounding environment due to the high quantities of exhaust air, the high noise level, the large amount of space required as well as the high investment and energy costs are well known.

A process of cleaning waste water in high cylindrical towers similar to a bubble column is also known (DE-Z "Chemie-Ingenieur Technnik" 54 (1982), No. 11, pages 939 to 952). However, because of the unfavourable hydrodynamic conditions and thus the relatively poor mass transfer properties of bubble columns, their space loading is comparatively low, this being the quantity of pollutants measured in CSB in relation to the volume of the reaction vessel and the day. It is approximately 1 kg CSB/m$^3$d. The gassing process is effected exclusively at the base of the respectively utilised tower whereby the specific energy requirements for this method are relatively high.

A method is known from DE 41 05726 C1 wherein a reaction vessel is used which is referred to in the specialist field as a "loop-type bubble column reactor". A loop-type bubble column is a cylindrical container arranged such that its axis is vertical and in the interior whereof there is placed a guide tube that is open at both ends and likewise arranged along its vertical axis. In the reaction vessel according to this publication, a two-component nozzle by means of which the waste water and gas are supplied is arranged above the guide tube. Here, the gas is supplied through a straight tube and a surrounding channel to a first mixing path of the two-component nozzle to which the waste water is also supplied via a ring channel. A second mixing path and a third mixing path adjoin the first mixing path in each case with a step or edge to edge. In addition, between the second and the third mixing path, there is arranged a ring channel having suction nozzles through which waste water and gas are sucked in, these being mixed in the third mixing path by the substrate located in the two-component nozzle.

In the method according to DE 198 42 332 A1, an upper plug-in tube and a lower plug-in tube separated by a partition plate are present in the reaction vessel which is likewise implemented as a loop-type bubble column reactor. The gas is supplied to the reaction vessel by a gassing unit which is arranged on the base of the reaction vessel. A nozzle consisting of two concentric tubes is placed in the vicinity of the partition plate and a liquid being delivered by a pump flows downwardly through said nozzle into the lower plug-in tube. Further liquid is thereby entrained by this one-component nozzle.

The reactor according to DE 40 12 300 A1 which, is likewise implemented as a loop-type bubble column reactor, comprises an insert in the form of a flow guide tube having a nozzle at the lower end thereof although the construction of the nozzle is not described in the publication. Gas is supplied to this nozzle through a first line and waste water is supplied thereto through a second line. In accordance with the drawings of this publication, the nozzle part serving for the supply of gas is longer than the nozzle part intended for the waste water.

The reactor according to DE 37 03 824 A1, which is also implemented as a loop-type bubble column reactor, has an insert in the form of a guide tube (with a deflector) into which a nozzle deeply projects. It has a central boring, a first annular gap for the supply of gas concentrically surrounding the boring and a second annular gap of the same axial length which concentrically surrounds the first annular gap. The waste water requiring cleaning is supplied through the central boring and the annular gap. The central boring is axially longer than the first annular gap serving for the supply of gas.

A higher conversion rate is achieved by the waste water treatment method of EP 0 130 499 B1 described hereinabove. This has a space loading of up to 70 kg CSB/m$^3$d. In the case of the loop-type bubble column reactor according to this publication, waste water and gas are introduced into a guide tube through a two-component nozzle consisting of two shock-free, concentrically arranged tubes. The tube of the two-component nozzle serving for the supply of the gas is located within the outer tube serving for the supply of the waste water. It projects out from the outer tube. When this loop-type bubble column reactor is in operation, a current flow in the form of a loop develops around the guide tube thereby mixing the liquid and the gas. The advantages of such a loop-type current flow are a relatively homogeneous flow of the two phases and, associated therewith, adequate transfer of the oxygen that is needed for the purification of the waste water from the gas to the liquid. In this known method, the gas is introduced into the guide tube from above so that it goes through a complete loop at least once before it can exit from the reaction vessel. However, the liquid supplied to the guide tube must provide a large amount of energy in order for the supplied gas that has been separated into bubbles to be transported downwardly by the loop-type current flow against its "propensity to rise".

SUMMARY OF THE INVENTION

The object of the invention is to further develop the method outlined hereinabove in such a way that the investment costs and energy requirements can be decreased.

In accordance with the invention, this object is achieved, in that the inner gas-conveying tube of the two-component nozzle, to which the gas is supplied by means of a blower, ends within the outer waste-water-conveying tube at a spacing from the outlet opening thereof which is greater by at least a factor of "5" than the internal diameter of the outer tube in the vicinity of the outlet opening, and in that the outlet opening of the outer tube and thus the two-component nozzle is spaced from the base of the reaction vessel, which contains no further fittings other than the two-component nozzle, by a distance which is greater than half the height of the waste water in the reaction vessel.

In this method, the waste water being moved in a circulatory manner and the gas are supplied to at least one two-component nozzle spatially separated from one another, whereby the gas is already pre-dispersed in the two-component nozzle because of the tube that is shorter in comparison with the outer tube. Upon emergence of the mixture of waste water and gas from the two-component nozzle into the contents of the reaction vessel, an impulse is transmitted by the mixture emerging from the two-component nozzle to the waste water in the reaction vessel by virtue of which the gas is additionally very finely dispersed and transported downwardly in the reaction vessel. Due to the downwardly directed flow of the mixture of gas and waste water thereby ensuing and the deflection thereof at the base of the reaction vessel, there is a resultant circulating current therein so that the gas is distributed very uniformly in the reaction vessel. A guide tube or a separate dispersion device, such as the frequently used ring distributor or a diaphragm distributor for example, are not needed in this method. Thus, as the reaction vessel manages without any separate fittings, it can be of very simple design. The investment costs are therefore low. Because of the lack of fittings, the energy requirements can also be reduced by this method.

BRIEF DESCRIPTION OF THE DRAWINGS

The method in accordance with the invention will be explained by means of exemplary embodiments with the aid of the drawings.

Therein.

DETAILED DESCRIPTION

Figure 1:
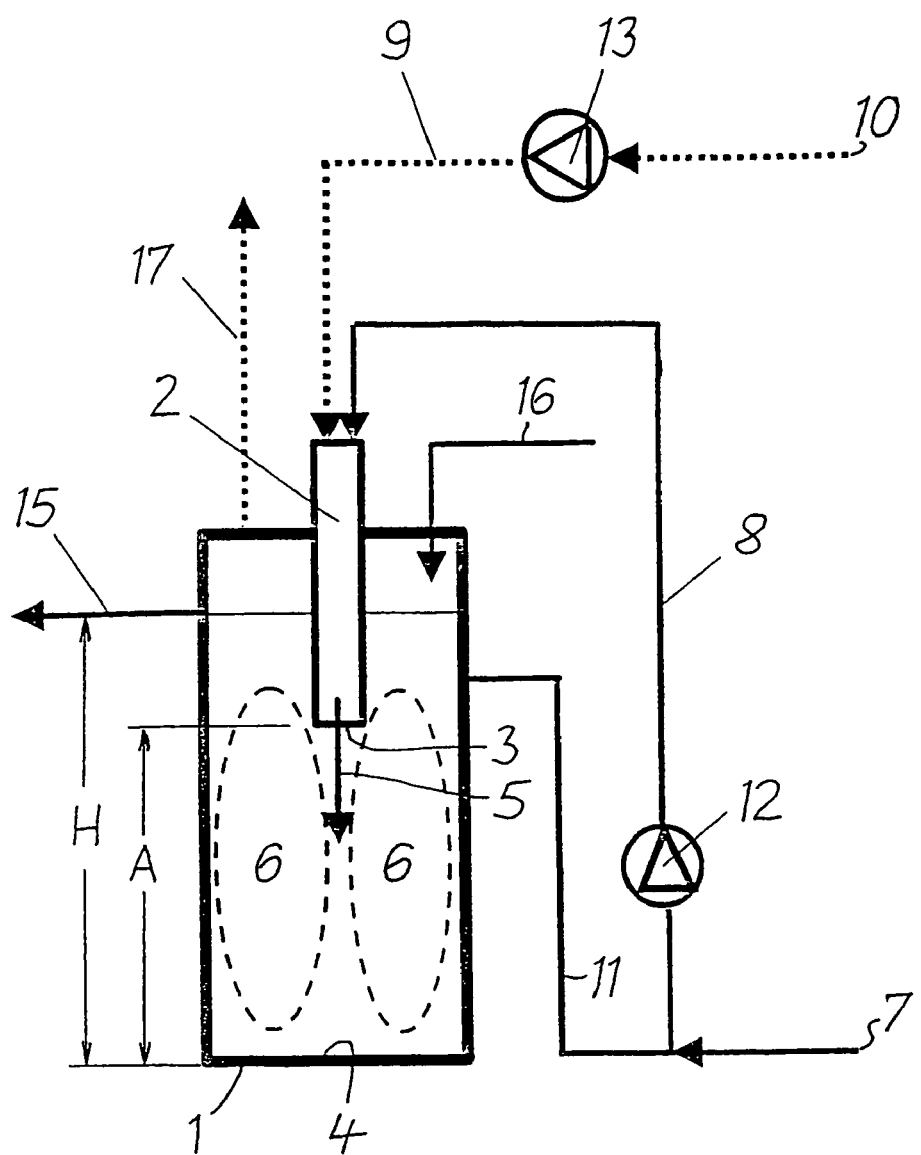
FIG. 1 shows schematically an arrangement for carrying out the method.
Figure 2:
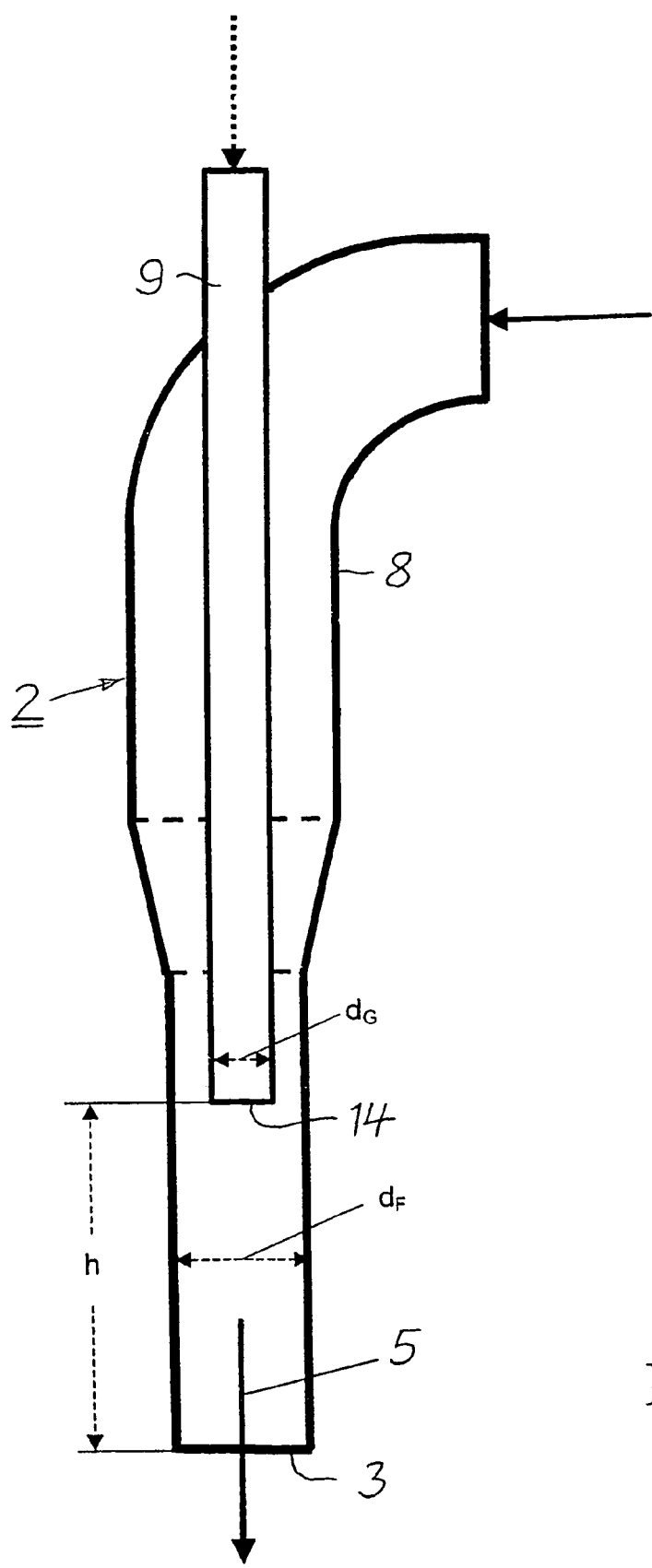
FIG. 2 shows a cross section through a two-component nozzle on an enlarged scale.

A two-component nozzle 2, whose more precise construction is apparent from FIG. 2, is arranged with its axis vertical in a reaction vessel 1 aligned along a vertical axis. The nozzle projects into the reaction vessel 1 and extends into the waste water present therein when the method is being effected. The outlet opening 3 of the two-component nozzle 2 is spaced from the base 4 of the reaction vessel 1 by a distance A which is greater than half the height H of the waste water present therein. The mixture of gas and waste water emerging from the two-component nozzle 2 in the direction of the arrow 5 is moved in the reaction vessel 1 in the form of circulating streams 6 as is depicted by the dashed lines.

The waste water 7 requiring cleaning is supplied to an outer tube 8 which forms a part of the two-component nozzle 2 at the end thereof projecting into the reaction vessel 1. An inner tube 9, whose end likewise appertains to the two-component nozzle 2, conveys the gas supplied thereto at 10. In addition, there is attached to the reaction vessel 1 a tube 11 which is connected to the outer tube 8. Waste water can be extracted from the reaction vessel 1 through the tube 11 and reintroduced therein together with new waste water in a recirculating manner by means of a pump 12. The gas is supplied to the two-component nozzle 2 by means of a blower 13. The pump 12 and the blower 13 ensure that the mixture of gas and waste water emerges from the two-component nozzle at a sufficiently high speed.

The ends of the tubes 8 and 9 are arranged mutually concentrically in the two-component nozzle 2. FIG. 2 shows a preferred embodiment of the two-component nozzle 2. The outer tube 8 is spaced around the inner, the gas conveying tube 9 so that a free annular gap is present around the latter through which the waste water can pass. The outer tube 8 is preferably narrowed in the vicinity of its outlet opening 3 which simultaneously forms the outlet opening of the two-component nozzle. The internal diameter of the inner tube 9 is referenced $d_G$, while the internal diameter of the outer tube 8 in the vicinity of its outlet opening 3 is referenced $d_F$. The ratio of $d_G$ to $d_F$ may lie in a range of between 0.6 and 0.9 for instance. It preferably amounts to 0.75. The inner tube 9 ends within the outer tube 8. Its open end 14 is spaced from the outlet opening 3 of the outer tube 8 by a distance h which is greater than $d_F$ by a factor of at least "5".

The method in accordance with the invention is carried out as follows for example:

The waste water that is to be cleaned (raw waste water) and is supplied through the tube 8 is supplied to the two-component nozzle 2 possibly together with waste water extracted from the reaction vessel 1 via the tube 11. At the same time, gas is supplied to the two-component nozzle 2 through the inner tube 9. At a sufficient speed of these two media, which can be produced by means of the pump 12 on the one hand and the blower 13 on the other, the gas is pre-dispersed in the two-component nozzle 2. Upon the emergence of the mixture of waste water and gas from the two-component nozzle 2 into the waste water in the reaction vessel 1, an impulse is transmitted from the mixture emerging from the two-component nozzle 2 to the waste water in the reaction vessel 1 by means of which the gas is additionally very finely dispersed and transported downwardly in the reaction vessel 1.

Circulating currents 6 are then produced due to the downwardly directed flow of the mixture of gas and waste water thereby ensuing and the deflection thereof at the base 4 of the reaction vessel 1 so that the gas is distributed very uniformly in the reaction vessel 1. The cleaned waste water can then leave the reaction vessel 1 together with biomass via a line 15. The waste water and the biomass can be separated from one another in a device located downstream of the reaction vessel although this is not shown here. A major part of the biomass can be fed back into the reaction vessel 1 via a line 16. The remainder of the biomass can be extracted as excess sludge.

The outlet opening 3 of the two-component nozzle 2 is—as already mentioned—located in the upper portion of the waste water in the reaction vessel 1, expediently at approximately two thirds of the height H of the waste water as reckoned from the base 4 of the reaction vessel 1. The gas is compressed to a greater or lesser extent by means of the blower 13 in dependence on the height at which the two-component nozzle 2 merges into the reaction vessel 1. A quantity of gas corresponding to that of the gas supplied can leave the reaction vessel 1 via a line 17.

Figure 3:
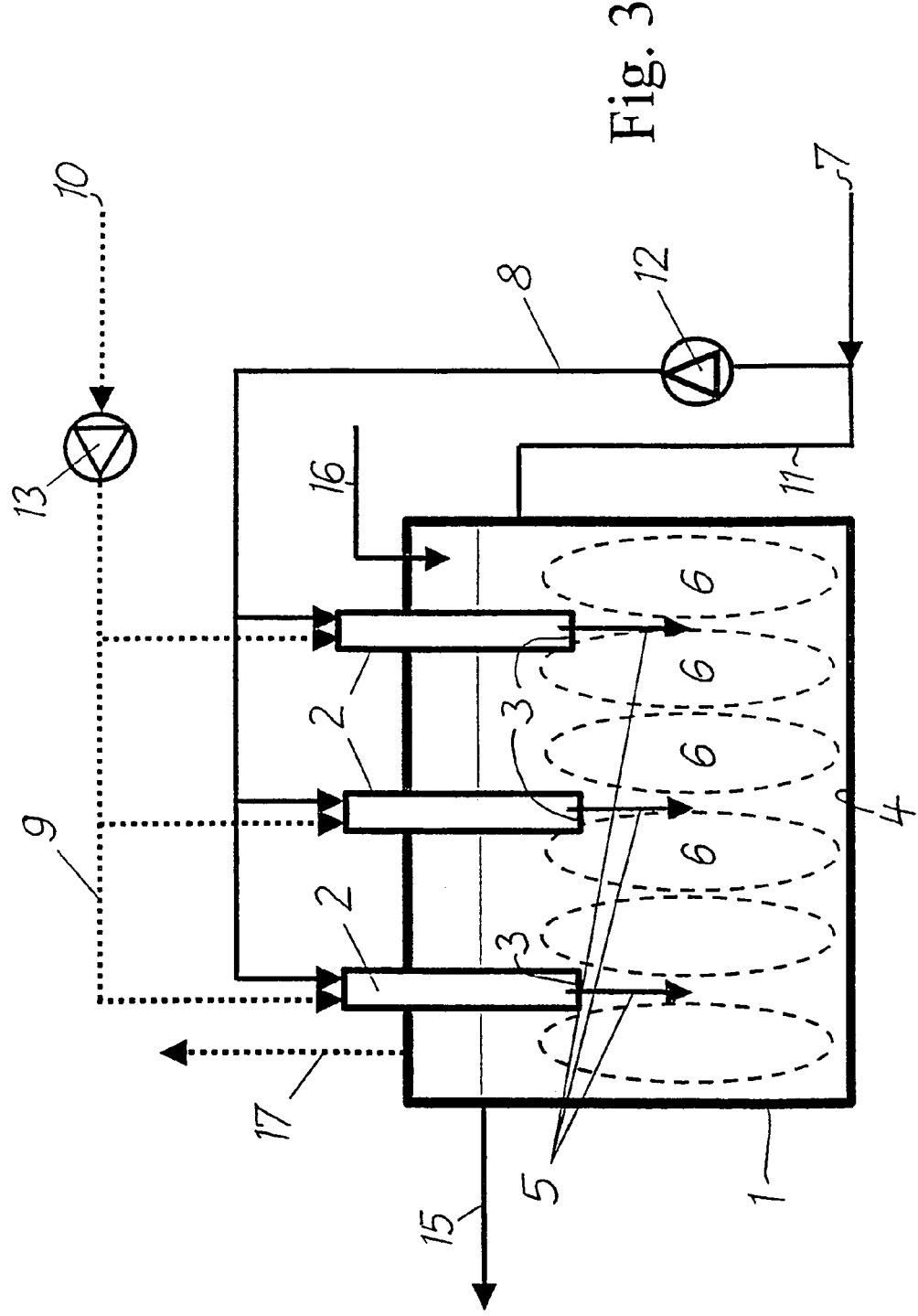
FIG. 3 shows an arrangement that is expanded compared with that of FIG. 1.

Since the ratio between the height and the diameter of the reaction vessels 1 and the speeds of the waste water and the gas in the two-component nozzle 2 must maintain particular values for fluid-dynamic reasons and because the overall height of the reaction vessel 1 is limited for energetic reasons, it is expedient for a plurality of two-component nozzles 2 having corresponding inlets to be arranged in a reaction vessel 1 when dealing with large quantities of waste water. This is shown in FIG. 3 for three two-component nozzles 2 for example. The installation of a plurality of two-component nozzles 2 in a reaction vessel 1 has the additional advantage that the dispersion of the supplied gas is increased still further by the effect of the impact between the deflected and mutually impacting streams of fluid.

The invention claimed is:

1. A method for the biological cleaning of waste water in which the waste water and gas are supplied to a reaction vessel containing micro organisms through a two-component nozzle which consists exclusively of two steady mutually concentric tubes, said nozzle having no additional supply elements and projecting into the reaction vessel and into the waste water therein along its vertical axis, wherein the internally located gas-conveying inner tube of the two-component nozzle is surrounded through the intermediary of a free annular gap by the outer tube conveying the waste water which is delivered by means of a pump, and in which the mixture of waste water and gas in the reaction vessel is moved in circulatory manner, characterized in that the inner gas-conveying tube (9) of the two-component nozzle (2), to which the gas is supplied by means of a blower, ends within the outer waste-water-conveying tube (8) at a spacing (h) from the outlet opening (3) thereof which is greater by at least a factor of "5" than the internal diameter ($d_F$) of the outer tube (8) in the vicinity of the outlet opening (3), and in that the outlet opening (3) of the outer tube (8) and thus the two-component nozzle (2) is spaced from the base (4) of the reaction vessel (1), which contains no further fittings other than the two-component nozzle (2), by a distance (A) which is greater than half the height (H) of the waste water in the reaction vessel (1).

2. A method in accordance with claim 1, characterized in that the outlet opening (3) of the outer tube (8) and thus the two-component nozzle (2) is arranged at approximately two thirds of the height of the waste water contained above the base (4) of the reaction vessel (1).

3. A method in accordance with claim 2, characterized in that the waste water is supplied to the outer tube (8) of the two-component nozzle (2) together with waste water extracted from the reaction vessel (1).

4. A method in accordance with claim 3, characterized in that two or more two-component nozzles (2) are arranged without any other fittings in a reaction vessel (1).

5. A method in accordance with claim 1, characterized in that the waste water is supplied to the outer tube (8) of the two-component nozzle (2) together with waste water extracted from the reaction vessel (1).

6. A method in accordance with claim 1, characterized in that two or more two-component nozzles (2) are arranged without any other fittings in a reaction vessel (1).

7. A method in accordance with claim 2, characterized in that two or more two-component nozzles (2) are arranged without any other fittings in a reaction vessel (1).

* * * * *